Figure 1:
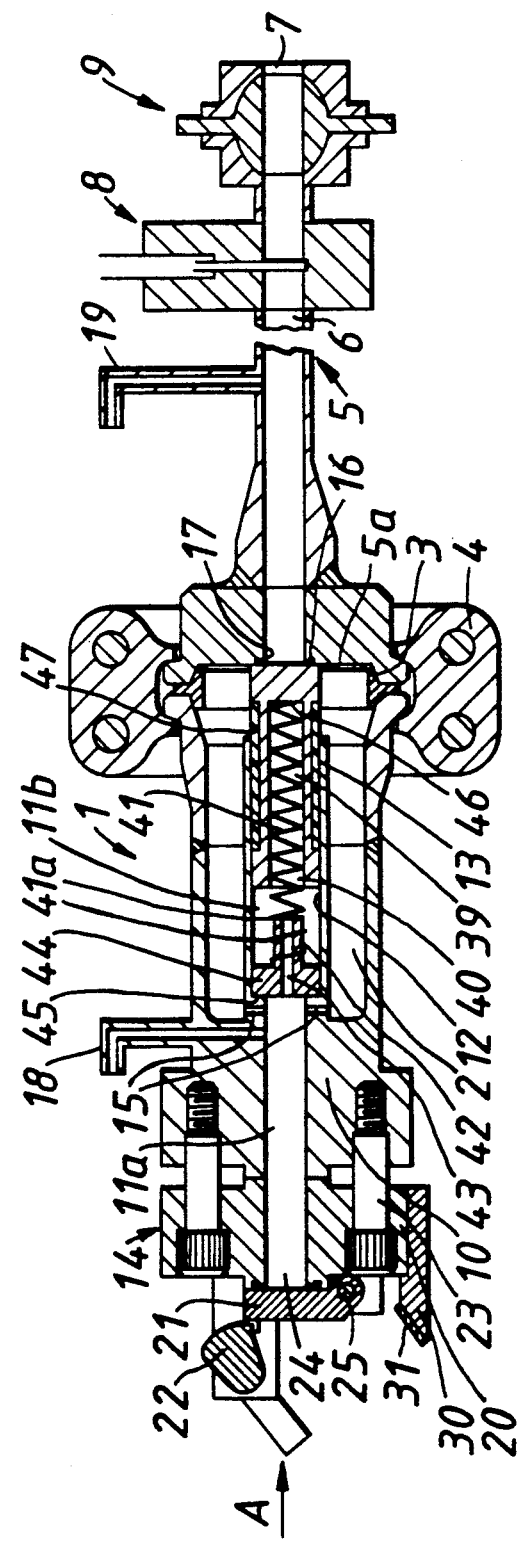

United States Patent [19]

Thomas et al.

[11] Patent Number: 5,091,891
[45] Date of Patent: Feb. 25, 1992

[54] SEISMIC PULSE GENERATION

[75] Inventors: Keith M. Thomas, Sutton; Michael R. Dongworth, Keston; Alec Melvin, Maidenhead, all of England

[73] Assignee: British Gas plc, London, England

[21] Appl. No.: 511,277

[22] Filed: Apr. 23, 1990

[30] Foreign Application Priority Data

Apr. 21, 1989 [GB] United Kingdom ............ 8909068

[51] Int. Cl.⁵ .................................. G01V 1/137
[52] U.S. Cl. ..................... 367/144; 181/118
[58] Field of Search ............. 181/116–120; 367/144–146

[56] References Cited

U.S. PATENT DOCUMENTS

| | | | |
|---|---|---|---|
| 3,724,809 | 4/1973 | Reale | 251/58 |
| 3,741,333 | 6/1973 | Muniz et al. | 181/120 |
| 3,800,907 | 4/1974 | Chelminski | 181/119 |
| 4,108,271 | 8/1978 | Chelminski | 181/119 |
| 4,182,428 | 1/1980 | Savit | 181/114 |
| 4,633,969 | 1/1987 | Palmer | 181/118 |
| 4,667,766 | 5/1987 | Melvin | 181/113 |
| 4,939,704 | 7/1990 | Chelminski | 367/146 |

Primary Examiner—Brian S. Steinberger
Attorney, Agent, or Firm—Larson and Taylor

[57] ABSTRACT

A seismic pulse generator comprises a body 1 having an internal gas-pressurizable first chamber 2 adjoining a second chamber 6 for containing a fluid. A flap valve member 21 is rotatable about a pivot axis for closing a bore 24 communicating with the first chamber. A latch 22 releasably retains the flap valve member in the closed position and a gas operated piston 13 slidably moves within an associated cylinder 12. When the first chamber 2 is pressurized with gas and the flap valve member 21 is released from its closed position to uncover the bore 24, the piston 13 moves to cause communication between the chambers 2,6 and generation of a shock wave in the second chamber. The second chamber has outlet means 7 to permit a pulse of energy to be transmitted from the second chamber in response to the shock wave generated in the second chamber. The flap valve member can be arranged to be openable such that full bore opening of the bore 24, loss of gas pressure from bore 24, and the response of piston 13 to cause communication between the chambers can all be achieved very rapidly.

35 Claims, 4 Drawing Sheets

SEISMIC PULSE GENERATION

The present invention relates to seismic pulse generation and, more particularly, to seismic pulse generators for use, for example, in both on-shore and off-shore exploration.

The kind of seismic pulse generator with which the invention is concerned is that which basically includes a two-chamber device in which a "driver" gas at relatively high pressure in one chamber is employed to generate a shock wave in the other chamber which is at relatively low pressure. The chambers are not allowed to communicate with each other until the generator is operated. Communication between the two chambers may be prevented for example by means of a releasable shuttle valve member which in the closed position closes an opening between the chambers. When the shuttle valve member is released from this closed position a shock wave is developed and propagates in the low pressure chamber. In a prior art device the release of the shuttle valve member from the closed position mentioned above may be initiated by the release of a pressure release valve such as a poppet-valve as described in U.S. Pat. No. 4,667,766 (Melvin).

According to the invention, a seismic pulse generator comprises a body having an internal gas-pressurizable first chamber adjoining a second chamber for containing fluid, a flap valve member rotatable about a pivot axis for closing an opening associated with the first chamber, means for releasably retaining the flap valve member in the closed position, and a gas operated or gas driven piston which is slidably movable within an associated cylinder and which, when the first chamber is pressurised and the flap valve member is released from its closed position to uncover the opening, moves to cause communication between the chambers and generation of a shock wave in the second chamber which has means to permit a pulse of energy to be transmitted from the second chamber in response to the shock wave generated in the second chamber.

The second chamber may be gas-pressurisable and the means to permit a pulse of energy to be transmitted may be outlet means to permit the release of gas pressure and shock wave from the second chamber.

Preferably, the flap valve member is pivotable between open and closed positions about hinge means connected to the generator body, and the retaining means comprises a latch means mounted on the generator body and pivotably movable about pivot means to and from a position wherein it releasably retains the flap valve member in the closed position.

The latch means may overlie and engage the exposed side of the flap valve member, that is the side of the flap valve member remote from the interior of the first chamber, when the member is retained in the closed position.

Conveniently, the generator comprises specific stop means to limit the extent to which the latch means can overlie the flap valve member in the releasably retained closed position.

In a preferred embodiment, the axes about which the flap valve member and pivotable latch means are rotatable are substantially parallel. In this case the latch means may comprise an eccentric which extends radially from and is fixedly connected to a rotatable shaft about which the latch means pivots and which is rotatably mounted in support means connected to the generator body. When the flap valve member is in the retained closed position, a circumferential edge portion of the latch means remote from the shaft may engage the exposed side of the flap valve member to effect the closure.

The plane in which the pivotable latch means rotates may be substantially coplanar with the plane in which the flap valve member pivots or rotates between its closed and open positions. Such an arrangement allows the central engagement of the latch means with the flap valve member and thus enables a generally centrally and evenly distributed closing force to be applied to the flap valve member.

Conveniently, when the flap valve member is in the releasably retained closed position the direction of the force acting through the latch means to keep or retain the flap valve member shut lies substantially on a straight line passing through the region of engagement between the latch means and the flap valve member, the latch means, and the shaft about which the latch means rotates. This arrangement lends itself well to the provision of a strong construction of flap valve member assembly for resisting a high pressure force urging the closed flap valve member to an open position. As the pressure urging the closed flap valve member to an open position increases, the flap valve member and overlying latch means are forced harder against each other.

Furthermore, when the flap valve member is in the releasably retained closed position the means may be rotatable in one direction to release the latch means from engagement with the flap valve member to allow the latter to be rotatable in substantially the same rotary direction to expose the opening.

Conveniently, the generator may comprise further means operable to move the retaining latch means selectively to and from the position wherein it releasably retains the flap valve member in the closed position. Where the retaining means is the pivotably movable latch means the further operable means may be a lever which extends from and is connected to the pivot means of the latch means. In addition, the generator may comprise actuatable means for operating the further operable means. For example, the actuating means may comprise a motor-driven or hydraulically-driven cam which may be operated remotely.

The extent to which the flap valve member can open from its closed position may be limited by the provision of a limit stop means. For example, the limit stop means may be located on the opposite side of the pivot axis of the flap valve member to the opening.

The flap valve member may be rotatably openable to such an extent from its closed position as to be capable of providing for substantially full bore opening of the opening.

Conveniently, the flap valve member and the retaining means are mounted on a supporting part which forms part of the generator body and is connected to a body part which at least in part defines par of the first chamber. Such supporting part may be releasably connected to the said body part and may define the opening associated with the first chamber. In this latter instance the supporting part, associated flap valve member and retaining means may form a discrete assembly which could be provided separately, if required, as a spare part or separate item either to be connected to a generator body part or alternatively for some other purpose.

Annular sealing means may be provided so as to be engaged around the opening between the flap valve member and the generator body when the flap valve member is in the retained closed position. Conveniently, the sealing means is seated in the surface of the generator body around the opening.

In a preferred embodiment the piston itself is a shuttle valve member which is releasably engageable with an annular sealing member provided around an opening between the first and second chambers with the latter opening providing communication between the chambers when the piston moves off of or out of engagement with the sealing member. The opening between the first and second chambers may be defined by a generator body part defining the second chamber.

Resilient means may urge the piston towards a position whereat communication between the first an second chambers is substantially prevented. The resilient means may be compression spring means which acts between the piston and abutment means fixed relative to the cylinder. The abutment means may comprise an annular shoulder at or adjacent the end of the cylinder remote from the second chamber. Conveniently, the compression spring means has an end part attached to an abutment member which abuts against the abutment means and is apertured so as to provide communication between the interior of the cylinder and the opening which is closable by the flap valve member.

Conveniently, there is provided a surface formed of friction reducing material, such as polytetrafluoroethylene, to facilitate sliding of the piston within the cylinder. For example, at least part of the outer surface of the piston is formed of the friction reducing material. The friction reducing material may be in the form of a collar or sleeve which extends around the outside of the piston. The collar or sleeve may be located in a recess which extends around the piston.

Figure 2:
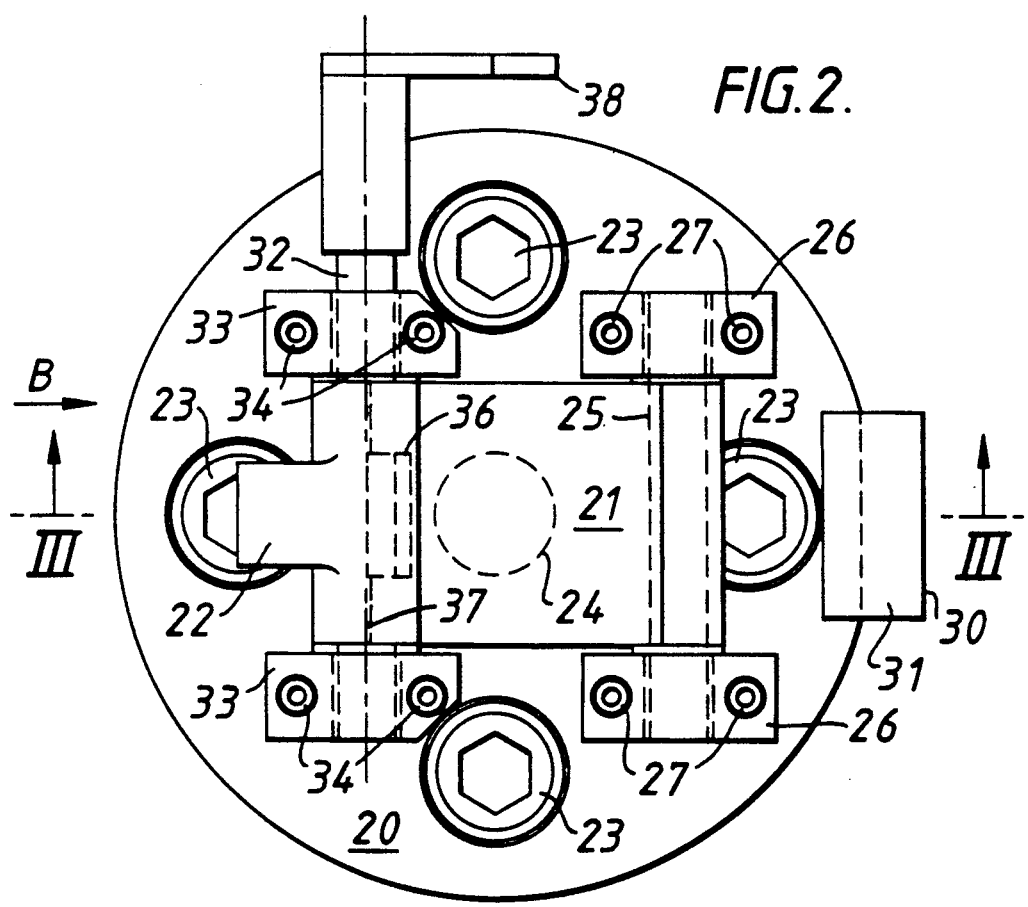
Figure 3:
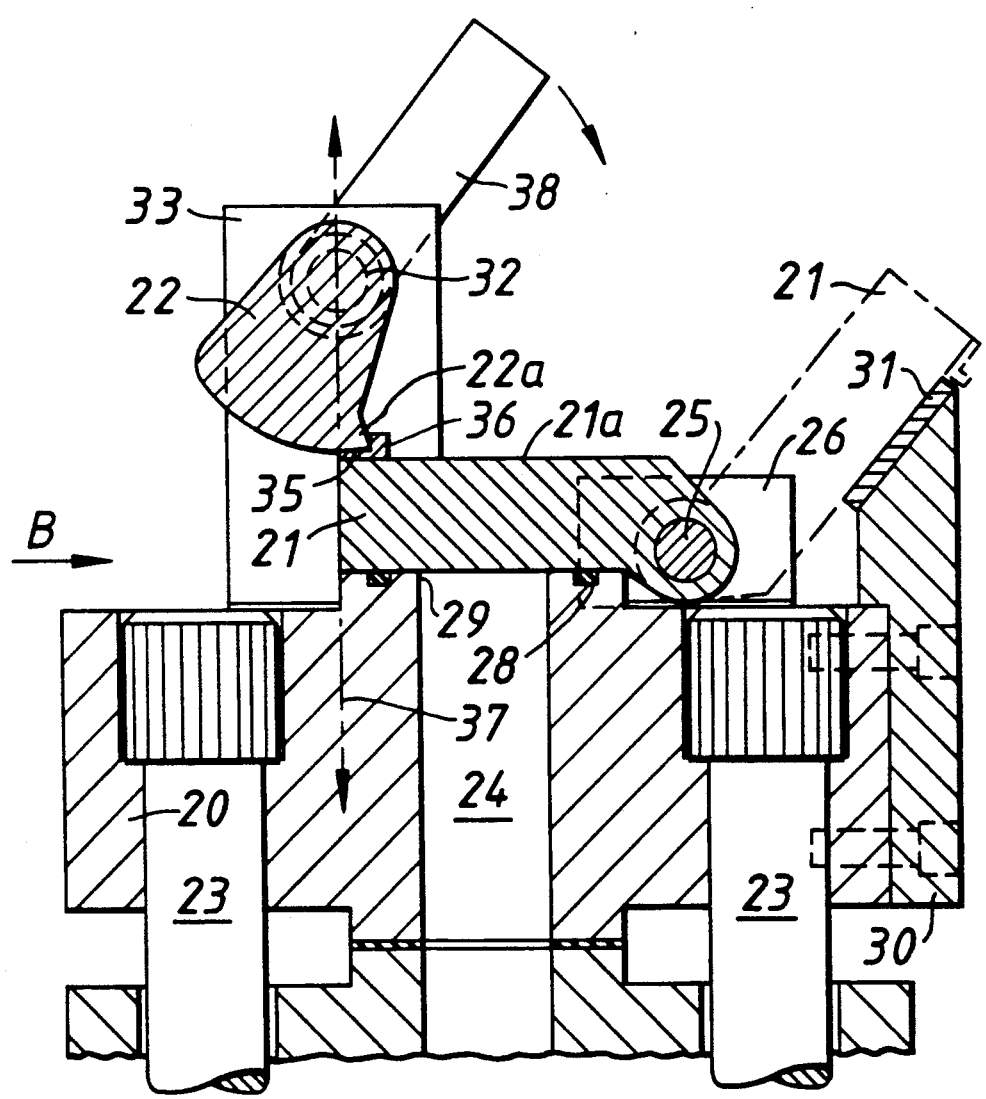
Figure 4:
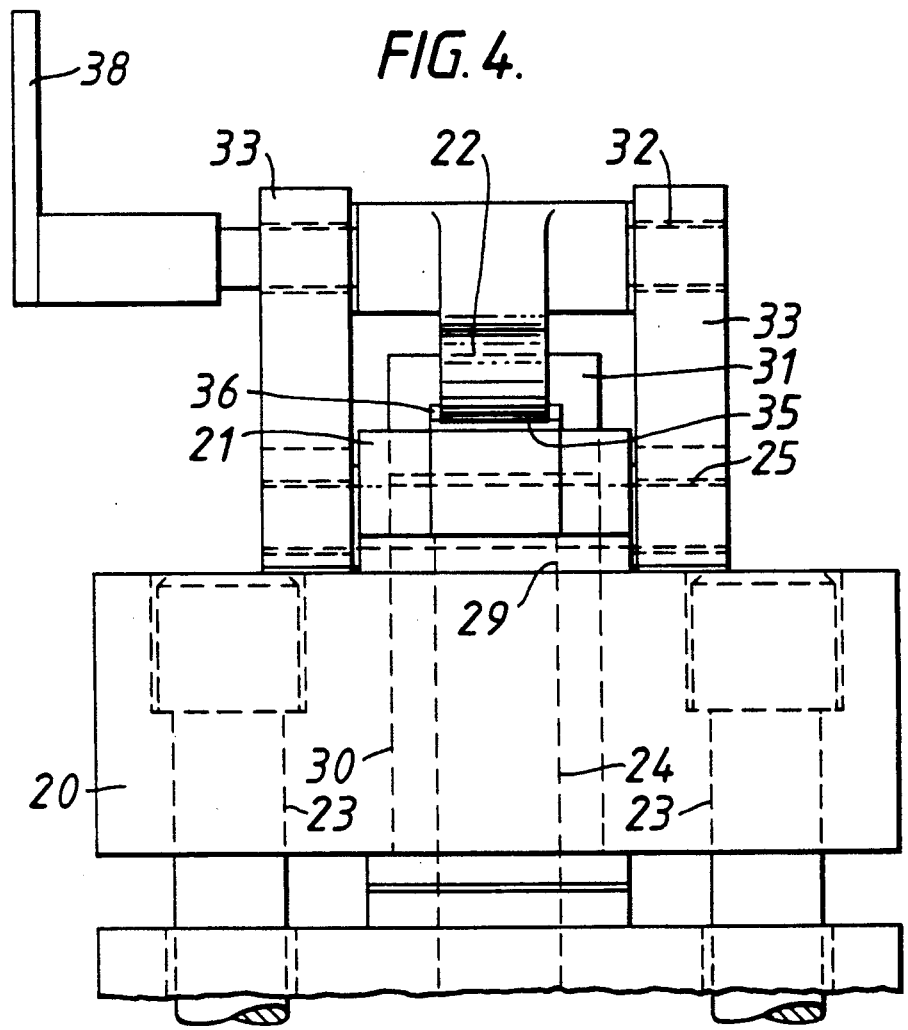
Figure 5:
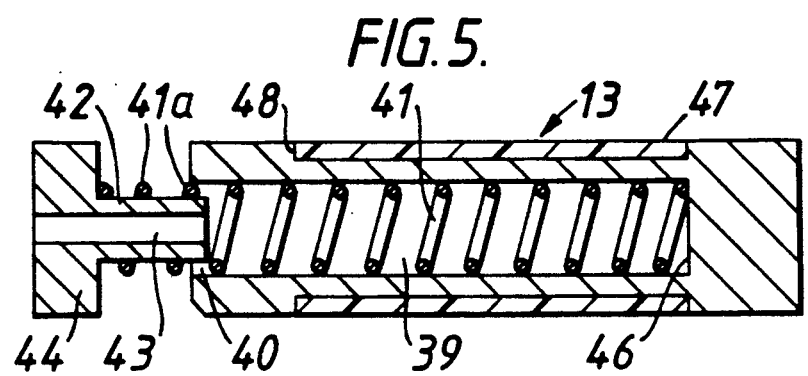

In order that the invention may be more readily understood, reference will now be made, by way of example only, to the accompanying drawings, in which:

FIG. 1 is a schematic representation of one embodiment of a seismic pulse generator according to the invention, FIG. 2 is an enlarged view of one end of the generator showing a flap valve assembly in the direction of arrow A in FIG. 1, FIG. 3 is a sectional view of the flap valve assembly taken on the line III—III in FIG. 2, FIG. 4 is a view of the flap valve assembly in the direction of arrow B in FIG. 3, and FIG. 5 is an enlarged scrap view of part of the generator of FIG. 1 showing the piston valve arrangement.

With reference to FIG. 1, a seismic pulse generator which can be operated or "fired" repetitively comprises a first body part 1 which defines a first chamber 2 for relatively high pressure gas and is connected by means of a ring seal 3 and circular flange clamp 4 to a second generally tubular body part 5 which in turn defines a second chamber 6 for relatively low pressure gas.

The second body part has an opening 7, constituting an outlet, at the end remote from the first chamber 2 to permit the release of gas pressure from the low pressure chamber 6. A gate valve 8 and full-bore ball-valve 9 are provided on the second body part 5 to control opening and closing of the outlet.

An integral generally tubular body portion 10 of part 1 extends part way into the first chamber 2. Together, the body portion 10 and that part of the main body part 1 from which body portion 10 extends define smaller and larger internal diameter bore portions 11a and 11b through the body part 1. The body portion 10, in part, provides a cylinder which defines the bore portion 11b of larger diameter and which constitutes an actuating chamber 12 for piston valve 13. At the end of the first body part 1 remote from the second body part 5, there is secured a flap valve assembly 14. Two bleed or fineholes 15 in body portion 10 provides communication between the chamber 2 and bore portions 11a and 11b. The piston, which constitutes a shuttle valve member, is operable to be releasably engageable with an annular sealing member 16 provided in end face 5a of body part 5 around opening 17. The opening 17, which is defined by the second body part 5, is to provide communication between the chambers 2 and 6 when the piston moves out of engagement with the annular sealing member, as will be described in more detail below.

Gas supply means in the form of inlet pipes 18, 19 are connected to the first and second body parts 1, 5 respectively, to permit the supply of pressurising gases to the associated chambers 2, 6.

The construction of the flap valve assembly 14 may be more clearly seen having regard to FIGS. 2 to 4 of the drawings.

The flap valve assembly in this embodiment is a discrete part of the generator construction and comprises a supporting part 20, a flap valve member 21, and latch means 22 for releasably retaining the flap valve member in a closed position. The supporting part 20 is releasably secured or connected to the end of the body part 1 by means of bolts 23 or the like. A bore 24 extends through the supporting part 20 and communicates with the bore portions 11a and 11b which extend through the body part 1.

The flap valve member is pivotably mounted on the supporting part by means of a hinge arrangement comprising a shaft 25 about which the flap valve member 21 pivots, and aligned journal members 26 in which the opposite ends of the shaft 25 are rotatably mounted. The journal members 26 are secured to the supporting part by, for example, bolts 27.

The flap valve member is pivotably movable between a closed position, as shown for example in full lines in FIG. 3, and a fully open position, as shown in broken outline in the same figure. In the closed position the flap valve member engages an annular seal 28 seated in a protruding planar face portion of the outer face of the supporting part 20 around an opening 29 which is defined by the supporting part at the outer end of the bore 24, thereby to close the opening and seal off the aligned bores 11 and 24.

On reaching the fully open position, which is beyond a position which provides for full bore opening of opening 29, the flap valve member 21 comes into contact with a limit stop means 30 to prevent further opening of the member 21. The limit stop means is secured to the supporting part 20 on the side of the shaft 25 remote from the opening 29 and has a planar contact face 31 disposed at such an angle that the exposed planar face 21a of the flap valve member meets the contact face full-face on as can be seen from the broken outline position of the flap valve member in FIG. 3.

The latch means 22 is in the form of a rotatable eccentric latch or cam which extends radially from and is fixedly connected to rotatable shaft 32 which is rotatably mounted in support means constituted by aligned journal members 33 which are secured to the supporting part 20 for example, by means of bolts 34. The latch 22 and flap valve member 21 are arranged such that the respective shafts 32, 25 about which they are rotatable are substantially parallel to each other and that the planes in which they are rotatable are substantially coplanar.

The latch 22 is rotatable about the shaft 32 to and from a position wherein it releasably retains the flap valve member 21 in the closed position as shown in FIG. 3. In order to retain the flap valve member 21 in the closed position, a circumferentially protruding edge portion 22a of the latch relatively remote from the shaft 32 overlies and centrally engages the exposed outer side or face 21a of the flap valve member, via seating 35 provided on the latter, adjacent the free edge of the flap valve member remote from the shaft 25. The seating 35 has a stop portion 36 against which the latch abuts to limit the extent to which the latch 22 can overlie the flap valve member in the closed position.

When the flap valve member 21 is in the releasably retained closed position the direction of the force acting through the latch 22 to keep the flap valve member shut lies substantially on a straight line 37 passing through the region of engagement between the latch and flap valve member 21 (via the seating 35), the latch 22, and the shaft 32 about which the latch rotates. This arrangement can be constructed to resist strong forces urging the flap valve member to open as a result of a high pressure which may be present in the chamber 2 and bores 11 and 24 when pressurised with gas. Increase in pressure in bore 24 will tend to hold the latch 22 in position against seating 35 with greater force.

As viewed in FIG. 3 the latch 22 is rotated in a clockwise direction in order to release the latch from engagement with the flap valve member to allow the latter to be rotated, also in the clockwise direction, to uncover or expose the opening 29.

The latch 22 and flap valve member 21 constructions and their relative dispositions are such that when the trailing edge of the circumferential edge portion 22a of the latch moves off of the seating 35, the flap valve member is free to rotate well beyond a full bore open position with respect to opening 29 until it contacts the stop means 30.

Connected to and extending from one end of the shaft 32 is an operable means comprising a lever 38 which can be selectively moved to and from a position corresponding to the position whereat the latch 22 engages the flap valve member 21 to releasably retain the latter in the closed position.

Remotely actuatable means (not shown) such as a motor-driven or hydraulically-driven cam may be provided to operate the lever 38.

The piston valve 13 and its mounting in the actuating chamber 12 may be more readily seen in FIG. 5 of the drawings.

The piston valve has a recess 39 extending axially of the bore portion 11b and having a mouth 40 which opens in the direction towards the flap valve assembly 14. A helical compression spring 41 is partly located within the recess. An end portion 41a of the spring 41 protruding from the mouth of the recess is fitted onto a spigot 42. An axial aperture or bore 43 extends through the spigot to allow communication between the bore 24 and bore portions 11a, 11b. Spigot bore 43 is a relatively low resistance-to-gas flow bore. The spigot has a flanged end portion 44 which abuts against an annular shoulder 45, forming a stop, provided at the junction of the bore portion 11a and chamber 12. The compression spring 41 acts between the flanged end portion 44 abutting the annular shoulder 45 and the closed end 46 of the recess in the piston valve 13 to urge the latter into engagement with the annular sealing member 16 and substantially prevent communication between chambers 2 and 6. As can be seen from FIG. 1, a portion of the piston protrudes beyond the free end of the chamber 12 remote from the annular shoulder 44.

To facilitate sliding of the piston valve 13 within the associated cylinder forming the actuating chamber 12, a collar or sleeve 47 made of friction reducing material, such as polytetrafluoroethylene, is located in an annular recess 48 extending around the piston valve to provide the latter with an outer surface formed of friction reducing material slidingly to engage the interior surface of the chamber 12.

A method of operating the above seismic pulse generator will now be described.

Firstly it is necessary to "set" or prime the generator for firing or producing a pulse. With the flap valve member 21 releasably retained in its closed position over the opening 29 by the latch 22, and the gate- and ball-valves 8, 9 closed, any gases present in chambers 2, 6 and bore portions 11a, 11b and bore 24 are substantially exhausted therefrom. A gas of relatively high sound speed, preferably helium, is pumped via the inlet pipe 18 into bore portion 11a, and thus into bore 24 and actuating chamber 12 with which bore portion 11a communicates. During this pressurising stage high pressure chamber 2 is pressurised to a precalculated pressure via fine holes 15. The piston valve 13 is caused to sealingly engage the annular sealing means 16 around the opening 17 to seal off communication between the chambers 2 and 6. Any gas which may have entered the low pressure chamber 6 during the pressurising of chamber 2 is substantially exhausted from chamber 6 before the latter is pressured to a precalculated pressure by pumping into it a gas of relatively low sound speed, for example air or carbon dioxide via inlet pipe 19. The two chambers 2 and 6 are thus pressurised to, and held at, respective predetermined pressures.

When the lever 38 is operated by the actuating means to selectively move the latch 22 out of engagement with the flap valve member 21 the latter swings open very rapidly to a full-bore open position with respect to opening 29. With this construction of flap valve assembly the full-bore open position of the flap valve member may be reached in under 0.01 sec. The uncovering of the opening 29 results in rapid loss of gas from the relatively low resistance-to-flow bore 24, bore portions 11a, 11b and spigot bore 43 through that opening. However, the relatively high resistance-to-flow fine-holes 15 prevents the gas pressure in the high pressure chamber 2 falling appreciably over the same time period. This results in an imbalance in pressure between the high pressure chamber 2 and the bore portions 11a, 11b and bore 24 behind the piston valve 13. Such pressure imbalance overcomes the force of compression spring 41 urging the piston valve into engagement with the annular sealing means 16 to cause the piston valve to disengage from the sealing means 16 and move away from the opening 17 to a retracted position wherein the rear end of the piston valve reaches the flanged end portion 44 of the spigot 42 and the front end of the piston valve reaches a position substantially level with the free end of the cylinder 12. The disengagement of the piston valve from the sealing means allows communication between the chambers 2 and 6 and thus allowing gas from the relatively high pressure chamber 2 to flow rapidly into the lower pressure chamber 6. With chamber 6 already pressurised as described above, a shock wave develops and propagates into the gas in chamber 6, and exits therefrom via gas-valve 8 and ball-valve 9 which are controlled remotely (not shown). The generator is so controlled by a control system that, first, the exit ball-valve 9 in chamber 6 opens fully, although relatively slowly, and then the gate valve 8 opens rapidly. Only when the gate valve is fully open to full-bore is the operating means 38 actuated so as to release the latch 22 from engagement with the closed flap valve member 21 to cause the firing of the shock. The ball-valve 9 is then closed or partially-closed automatically a predetermined time after the shock wave has exited from chamber 6.

In the medium of subsequent propagation, whether the medium be solid or water, the shock wave is converted to a sub-sonic acoustic pulse.

Subsequent to the release of the gas pressure and shock wave from chamber 6 and the equilibrating of the pressures within the generator, the biasing force of the compression spring 41 reseats the piston valve 13, that is urges the piston valve back into engagement with the annular sealing means 16.

By way of example, preparatory to the firing of the generator, the high pressure chamber 2 may be pressurised to a pressure of 25-350 bar with, say, helium, whilst the low pressure chamber 6 may be pressurised to a pressure of 1-12 bar with, say, carbon dioxide. All the body parts 1, 5, and 14 may be of steel construction. Typically, the body part 5 may be about 1-2 m in length and its chamber or bore 6 may have an internal diameter of, say, about 2.5-10 cm.

Applicants have made investigations using a generator wherein: the high pressure chamber 2 was primed by being pressurised with helium to different pressures; the body part 5 was about 2 m in length; the low pressure chamber 6 was primed by being pressurised to a pressure of about 14.7 psi with carbon dioxide. The investigations showed that by firing the generator with the chamber 2 pressurised to 1200 psi, the flap valve pivoted to an open position 45° from the closed position in about 2 ms (milli sec) and to an open position 90° from the closed position in about 4 ms. By using a pressure transducer at the outlet end 7 of the chamber 6, Applicants found that the rise time to the peak pressure (Pmax) of the shock pulse produced (as measured by the transducer) was about 5-6 μs (micro sec) from the time of actuating the flap valve. It will be appreciated from these figures that the rise time and thus the peak pressure of the shock pulse occurs well before the flap valve has opened to the 45° position.

By way of illustration, rise times and shock pulse peak pressures (Pmax) which Applicants observed when firing the generator at various helium pressures ($P_{He}$) are shown below:

| $P_{He}$ (psi) | Approx. Rise time (μs) | Pmax (shock) (psi) |
|---|---|---|
| 400 | 4 | 500 |
| 600 | 6 | 850 |
| 800 | 5 | 1200 |
| 1000 | 6 | 1300 |
| 1200 | 5 | 1550 |

Ideally, seismic gun decompression would occur under isentropic conditions, where the maximum energy is transferred to the acoustic pulse. In practice, previously known designs of seismic guns do not permit wholly isentropic operation and the decompression is usually at least partially isenthalpic. A need to reserve part of the gas flow to counteract so-called "bubble-implosion" accentuates the tendency towards isenthalpic operation and in general it is believed that such guns do not produce pressures in the initial pulse which are anywhere near as high as could be expected from isentropic flow considerations.

Use of a "driver" gas and a different "shocked" gas with the above described generator embodiment according to the invention can reduce the problem referred to above as it can be arranged that pressures substantially equal to those generated in an isentropic release are generated by creation of a non-equilibrium flow shock wave by non-explosive means in the gas just prior to release. Where the seismic pulse generator is used off-shore, release of the shock wave into water gives rise to an acoustic pulse of high energy content under flow conditions equivalent to isentropic flow. Control of the bubble effect by partially closing the exit valve to provide a gas flow to prevent implosion is now feasible without affecting the isentropic equivalence of the initial pulse.

In order to "fire" another shock wave the earlier described sequence for setting or priming and firing the generator is repeated.

Whilst a particular embodiment of the invention has been described above it will be appreciated that various modifications may be made without departing from the scope of the invention. For example, the gate valve 8 may be replaced by an iris diaphragm valve.

We claim:

1. A seismic pulse generator comprising: a generator body having an internal gas-pressurizable first chamber adjoining a second chamber for containing a fluid; a flap valve member pivotable about a hinge means connected to the generator body from a closed position wherein the valve member closes an opening associated with the first chamber to an open position wherein the openings are uncovered; latch means mounted on the generator body and pivotally movable about pivot means to and from a position wherein the latch means releasably retains the flap valve member in said closed position; and a gas operated piston which is slidably movable within an associated cylinder and which, when the first chamber is pressurized and the flap valve member is released from its closed position to uncover the opening, moves from a position wherein the piston blocks communication between the chambers to a position wherein the piston allows communication between the chambers and allows generation of a shock wave in the second chamber; said second chamber including means for permitting a pulse of energy to be transmitted from the second chamber in response to the shock wave generated in the second chamber.

2. A generator as claimed in claim 1, wherein the latch means overlies and engages the exposed side of the flap valve member when the latter is retained in the closed position.

3. A generator as claimed in claim 2, comprising stop means to limit the extent to which the latch means can overlie the flap valve member in the releasably retained closed position.

4. A generator as claimed in any of claim 1 wherein the axes about which the flap valve member and the latch means are rotatable are substantially parallel.

5. A generator as claimed in claim 4, wherein the latch means comprises an eccentric which extends radially from and is fixedly connected to a rotatable shaft comprising the pivot means about which the latch means pivots, the rotatable shaft being mounted in support means connected to the generator body.

6. A generator as claimed in claim 5, wherein when the flap valve member is in the retained closed position, a circumferential edge portion of the latch means remote from the shaft engages the exposed side of the flap valve member.

7. A generator as claimed in claim 5, wherein the plane in which the latch means rotates is substantially coplanar with the plane in which the flap valve member rotates (pivots).

8. A generator as claimed in claim 4, wherein when the flap valve member is in the releasably retained closed position the direction of the force acting through the latch means to keep the flap valve member shut lies substantially on a straight line passing through the region of engagement between the latch means and the flap valve member, the latch means and the shaft about which the latch means pivots.

9. A generator as claimed in claim 4, wherein when the flap valve member is in the releasably retained closed position the latch means is pivotable in one direction to release the latch means from engagement with the flap valve member to allow the latter to be rotatable in substantially the same rotary direction to expose the opening.

10. A generator as claimed in claim 1, comprising further means operable to move the latch means selectively to and from the position wherein it releasably retains the flap valve member in the retained closed position.

11. A generator as claimed in claim 10, wherein the further operable means is a lever extending from and connected to the pivot means of the latch means.

12. A generator as claimed in claim 10, further comprising actuatable means for operating the further operable means.

13. A generator as claimed in claim 1, further comprising limit stop means to limit the extent to which the flap valve member can open from the closed position.

14. A generator as claimed in claim 13, wherein the limit stop means is located on the opposite side of the pivot axis of the flap valve member to the opening.

15. A generator as claimed in claim 1, wherein the flap valve member is rotatable to such an extent from the closed position as to be capable of providing for substantially full bore opening of the opening.

16. A generator as claimed in claim 1, wherein the flap valve member and the latch means are mounted on a supporting part which is connected to a body part of the generator body.

17. A generator as claimed in claim 16, wherein the supporting part is releasably connected to the said body part.

18. A generator as claimed in claim 16, wherein the supporting part defines the opening associated with the first chamber.

19. A generator as claimed in claim 1, wherein annular sealing means is provided so as to be engaged around the opening between the flap valve member and the generator body when the flap valve member is in the retained closed position.

20. A generator as claimed in claim 19, wherein the annular sealing means is seated in the generator body around the opening.

21. A generator as claimed in claim 1, wherein the piston is a valve member which is releasably engageable with an annular sealing member provided around an opening between the first and second chambers, said opening providing communication between the chambers when the piston moves out of engagement with the sealing member.

22. A generator as claimed in claim 21, wherein the opening between the first and second chambers is defined by a generator body part defining the second chamber.

23. A generator as claimed in claim 1, wherein resilient means urge the piston towards a position wherein the piston blocks communication between the first and second chambers is substantially prevented.

24. A generator as claimed in claim 23, wherein the resilient means is a compression spring means which acts between the piston and abutment means fixed relative to the cylinder.

25. A generator as claimed in claim 24, wherein the abutment means comprises an annular shoulder at or adjacent the end of the cylinder remote from the second chamber.

26. A generator as claimed in claim 24, wherein the compression spring means has an end part attached to an abutment member which abuts against the abutment means and is apertured so as to provide communication between the interior of the cylinder and the opening which is closable by the flap valve member.

27. A generator as claimed in claim 1, wherein there is provided a surface formed of friction reducing material to facilitate sliding of the piston within the cylinder.

28. A generator as claimed in claim 27, wherein at least part of the outer surface of the piston is formed of the friction reducing material.

29. A generator as claimed in claim 28, wherein the friction reducing material is in the form of a collar or sleeve which extends around the outside of the piston.

30. A generator as claimed in claim 29, wherein the collar or sleeve is located in a recess which extends around the piston.

31. A generator as claimed in claim 1, wherein, in the primed condition ready for firing a shock wave, the first chamber is pressurised with a gas selected from the group consisting of helium and hydrogen.

32. A generator as claimed in claim 31, wherein the first chamber is pressurised to a pressure of from 25 to 350 bars.

33. A generator as claimed in claim 1, wherein, in the primed condition ready for firing a shock wave, the second chamber is pressurised with a gas selected from the group consisting of carbon dioxide and air.

34. A generator as claimed in claim 33, wherein the second chamber is pressurised to a pressure of from 1 to 12 bars.

35. A generator as claimed in claim 34, wherein the second chamber is gas-pressurisable and the means to permit a pulse of energy to be transmitted is outlet means to permit the release of gas pressure and shock wave from the second chamber.

* * * * *